(12) United States Patent
Krampe et al.

(10) Patent No.: US 9,212,659 B2
(45) Date of Patent: Dec. 15, 2015

(54) APPARATUS FOR SEALING A PUMP CHAMBER OF A ROTARY LOBE PUMP, AND A ROTARY LOBE PUMP HAVING SAID APPARATUS

(75) Inventors: Paul Krampe, Essen (DE); Thomas Hinners, Essen (DE)

(73) Assignee: Hugo Vogelsang Maschinenbau GmbH, Essen (DE)

( * ) Notice: Subject to any disclaimer, the term of this patent is extended or adjusted under 35 U.S.C. 154(b) by 90 days.

(21) Appl. No.: 14/117,039

(22) PCT Filed: May 11, 2012

(86) PCT No.: PCT/EP2012/058783
§ 371 (c)(1),
(2), (4) Date: Jun. 12, 2014

(87) PCT Pub. No.: WO2012/152924
PCT Pub. Date: Nov. 15, 2012

(65) Prior Publication Data
US 2014/0294648 A1    Oct. 2, 2014

(30) Foreign Application Priority Data

May 12, 2011    (DE) ............ 20 2011 100 622 U

(51) Int. Cl.
*F03C 2/00*    (2006.01)
*F03C 4/00*    (2006.01)
*F04C 2/00*    (2006.01)
(Continued)

(52) U.S. Cl.
CPC ............. *F04C 15/0026* (2013.01); *F04C 2/126* (2013.01); *F04C 15/0038* (2013.01); *F04C 27/004* (2013.01); *F04C 27/007* (2013.01); *F04C 27/009* (2013.01); *F01C 21/108* (2013.01)

(58) Field of Classification Search
CPC ............. F04C 15/0026; F04C 15/0023; F04C 15/0038; F04C 2/126; F04C 27/001; F04C 27/004; F04C 27/005; F04C 27/007; F04C 27/009; F01C 21/108
USPC ............ 418/131–132, 140–141, 206.1, 206.6
See application file for complete search history.

(56) References Cited

U.S. PATENT DOCUMENTS 3,348,492 A * 10/1967 Olson et al. .................... 418/131
3,748,063 A *  7/1973 Putnam .......................... 418/132

(Continued)

OTHER PUBLICATIONS

International Search Report and Written Opinion in Application No. PCT/EP2012/058783, dated on Nov. 12, 2013.

(Continued)

*Primary Examiner* — Theresa Trieu
(74) *Attorney, Agent, or Firm* — Kilpatrick Townsend & Stockton LLP; Dean W. Russell; Renae B. Wainwright

(57) ABSTRACT

The invention relates to an apparatus for sealing a pump chamber of a rotary lobe pump vis-a-vis a fluid-free region of the rotary lobe pump, in particular in the region of a shaft duct, wherein the apparatus has two or more sealing elements, which can be disposed adjacent to a front side of a rotary piston disposed on a shaft in the pump chamber of the rotary lobe pump in such a way that a labyrinth gap extends between the sealing elements, said labyrinth gap being arranged in a radial direction relative to the shaft and in an axial direction in order to extend the seal land. According to the invention, the seal land is larger in a radial direction relative to the shaft than the seal land in an axial direction relative to the shaft.

12 Claims, 5 Drawing Sheets

(51) Int. Cl.
*F04C 15/00* (2006.01)
*F04C 27/00* (2006.01)
*F04C 2/12* (2006.01)
*F01C 21/10* (2006.01)

(56) References Cited

U.S. PATENT DOCUMENTS 3,961,872 A * 6/1976 Muller et al. .................. 418/132
4,311,445 A * 1/1982 Eley et al. ..................... 418/132
4,958,994 A * 9/1990 Griese et al. .................. 418/132
6,485,279 B2 * 11/2002 Zhong et al. .................. 418/141
2002/0044876 A1 4/2002 Yoshimura
2002/0081226 A1 6/2002 Zhong et al.
2009/0285711 A1 11/2009 Inagaki et al.

OTHER PUBLICATIONS

China Patent Application No. 201280030782.2, Examination Report dated Jun. 3, 2015.

* cited by examiner

APPARATUS FOR SEALING A PUMP CHAMBER OF A ROTARY LOBE PUMP, AND A ROTARY LOBE PUMP HAVING SAID APPARATUS

CROSS REFERENCE TO RELATED APPLICATIONS

This application is the U.S. national phase of International Application No. PCT/EP2012/058783 filed on May 11, 2012, which application claims priority to German Patent Application No. 20 2011 100 622.4 filed on May 12, 2011, the contents of both of which are incorporated herein by reference.

FIELD OF THE INVENTION

The present invention relates to an apparatus for sealing a pump chamber of a rotary lobe pump vis-a-vis a fluid-free region of the rotary lobe pump, in particular in the region of a shaft duct, wherein the apparatus has two or more sealing elements, which can be disposed adjacent to a front side of a rotary piston disposed on a shaft in the pump chamber of the rotary lobe pump in such a way that a labyrinth gap extends between the sealing elements, said labyrinth gap being arranged in a radial direction relative to the shaft and in an axial direction in order to extend the seal land.

The invention further relates to a rotary lobe pump for conveying fluids, in particular liquids containing solids, having a housing with a pump chamber and at least one pair of interlocking rotary pistons disposed inside the pump chamber, which are each mounted on a shaft, wherein the shaft extends out of the pump chamber into a fluid-free region of the rotary lobe pump.

Within the context of this description, axial is understood to be the orientation in the direction of the rotational axis of the piston or pistons respectively, which is also the shaft axis.

BACKGROUND OF THE INVENTION

In order to protect the functionality of known rotary lobe pumps, it is necessary to isolate fluid-free regions of the rotary lobe pump, for example areas containing gearing or bearings, from the fluid-conducting pump chamber by means of sealants. Otherwise, the penetration of liquids containing solids into the gear mechanism leads to severe signs of wear to the point of the failure of the gear mechanism after even a short period of time. In addition, the shaft and the shaft bearings must be protected against contamination by the liquid being conveyed. The region of the shaft duct from the fluid-conducting pump chamber to the fluid-free region of the pump requires special attention.

Known sealing apparatuses and known rotary lobe pumps provide for the use of sealing labyrinths in this context, which, as a contactless sealing element, make fluid transport from one side of the seal to the other side of the seal more difficult by extending the seal land, and on this basis, achieve a certain sealing action. The known sealing devices in the rotary lobe pumps do not function in a manner that is fully satisfactory, however. In the region of the base circle diameter of the rotary pistons in known rotary lobe pumps, a short-circuit current of fluid (leakage flow) from the discharge side to the suction side of the rotary lobe pump occurs at the front sides of the rotary pistons. This creates undesired piston-side wear in connection with the fiber materials being conveyed.

SUMMARY OF THE INVENTION

The object of the invention was therefore to specify an apparatus for sealing a rotary lobe pump, in particular in the region of the shaft duct, which mitigates the aforementioned disadvantages as much as possible and, where possible, contributes to an improved pump performance.

The invention achieves this underlying object with an apparatus of the aforementioned type, in which the seal land is larger in a radial direction relative to the shaft than the seal land in an axial direction relative to the shaft. Here, the invention makes use of the knowledge that the sealing action is significantly increased by the fact that the ability of a fluid containing solids to flow through the labyrinth gap decreases when the larger size of the component of the seal land in a radial direction in relation to the directional component of the seal land in an axial direction is more pronounced. This is achieved by the fact that, due to the rotation of individual or all sealing elements with the shaft, fluid located in the labyrinth gap is also involved in this rotation. A centrifugal acceleration thereby acts on the fluid, which increases the flow resistance of the fluid in relation to the radial motion component thereof. This effect becomes more pronounced the greater the ratio of fluids moved in a radial direction through the labyrinth gap in proportion to fluids moved in an axial direction.

Surprisingly, it has been found that the formation of a seal land that is larger in a radial direction relative to the shaft than the seal land in an axial direction relative to the shaft contributes to the sealing apparatus having an overall much more compact design in relation to the shaft length than in the case of the formation of the seal land that is larger in an axial direction. For this purpose, it is especially advantageous when the ratio by which the seal land in a radial direction is larger than the seal land in an axial direction falls in a range of 1 to 15. It is especially preferred that this ratio fall in a range of 5 to 10.

In a preferred embodiment, the orientation of the labyrinth gap is selected in such a way that the labyrinth gap has one or more gap sections that extend axially relative to the shaft, and one or more gap sections that extend radially relative to the shaft. This allows a stepped or meandering gap pattern to be achieved, wherein the bends also contribute to an increase in the flow resistance. In alternative embodiments, the labyrinth gap does not extend in a strictly axial or radial direction, but rather extends partially or completely at an angle between 0° and 90° relative to the shaft axis (when the apparatus is in an assembled state). In such an embodiment, the labyrinth gap presents itself at least in sections as a conical recess between the sealing elements.

It is especially preferred, however, that the labyrinth gap be formed having gap sections that extend radially and axially in alternation, since in this way, economical heating during manufacturing can be advantageously combined with a space-saving design.

According to another preferred embodiment of the apparatus according to the invention, at least one first sealing element can be fastened to a front side of the rotary piston by means of a form-locking or force-locking fastener, and at least one second sealing element can be fastened to the housing of the rotary lobe pump by means of a form-locking or force-locking fastener. The first sealing element is hereby formed as a co-rotating component, while the second sealing element is formed as a stationary component. In this way, the labyrinth gap or part of the labyrinth gap that extends between the first and second sealing element is bordered on one side by a rotating component and on the other side by a stationary component, through which fluid located in the gap is sheared, which leads to a further increase in the flow resistance and the sealing action. In addition, the fasteners make it possible to remove or exchange individual sealing elements. In the event of wear, the sealing elements can be exchanged for maintenance and repair purposes. In addition, an apparatus according to this embodiment having attachable sealing elements and in combination with the compact design according to the invention in terms of the axial installation space can be retrofitted in the case of conventional rotary lobe pumps without requiring that special modifications be made to the housing and/or pump chamber of the rotary lobe pumps.

A further advantage in connection with the labyrinth gap that extends between the sealing elements is seen in the fact that wear only occurs in the replaceable sealing elements and not on the piston surface or end face respectively, as in conventional rotary lobe pumps.

According to a preferred embodiment, the first sealing element is formed as an annular disk and has an outer diameter, which extends beyond the base circle of the rotary piston. The outer diameter of the first sealing element, which is formed as an annular disk, preferably delimits the start of the labyrinth gap on the piston side. The labyrinth gap thus starts in the region of the base circle diameter of the rotary piston or even further out.

According to another preferred embodiment, the first sealing element has a projection on the front side in an axial direction relative to the shaft, which is disposed against a shaft seal as a support. Alternatively, instead of the projection, the apparatus has a third sealing element, which is formed as a spacer ring, and which is disposed against the shaft seal as a support. It is especially preferred that the labyrinth gap extend from radially outside of the base circle diameter of the rotary piston from the front side of the rotary piston in the direction of the shaft seal, wherein the labyrinth gap extends radially in the direction of the shaft. A reduction in the flow wear to the sealing components and to the rotary piston, in particular in the region of the base circle, is achieved by means of this seal land (path through the labyrinth gap), since as compared to the path that the fluid could take without the labyrinth gap by means of the short-circuit flow from the discharge side to the suction side, the seal land is extended.

A further advantage provided by the design of the seal land according to the invention can be seen in the fact that a drop in pressure is created from the start of the labyrinth gap on the piston side to the end of the labyrinth gap on the shaft seal side by means of the essentially radial sealing labyrinth according to the invention. The pressure applied to the shaft seal is thus reduced in comparison with conventional arrangements, which increases the service life of the shaft seal. This functional principle can be applied to most shaft seals, in particular to cartridge seals.

According to another preferred embodiment, the second sealing element is formed as an outer protective plate and can be fastened to a wall of the pumping chamber of the rotary lobe pump.

It is also preferable that the second sealing element have a recess, the contour of which corresponds to the first sealing element in such a way that the first sealing element can be partially or fully disposed within the recess. A labyrinth gap is created when the first sealing element extends partially or completely within the second sealing element or the recess thereof respectively, and a labyrinth gap is provided, the shape of which is a function of the profiling and contour of the first sealing element and the second sealing element.

It is also preferable that the apparatus according to the present invention have a fourth sealing element, which is formed as an inner protective plate and can be fastened to a wall of the pump chamber of the rotary lobe pump adjacent to the first sealing element in such a way that a radial gap section extends between the first sealing element and the fourth sealing element.

In addition, it is preferred that the fourth sealing element have an outer diameter, which is larger than the outer diameter of the recess of the second sealing element. It is especially preferable that the fourth sealing element can be positioned overlapping the second sealing element. In this way, the labyrinth gap is closed to the outside on one side, and the fourth sealing element can still be attached to the housing of the rotary lobe pump, for example by means of the second sealing element by means of clamps.

In a further preferred embodiment of the invention, the first sealing element and/or the second sealing element and/or the third sealing element and/or the fourth sealing element is or are respectively formed rotationally symmetrical and can be coaxially disposed with respect to each other and with respect to the shaft. Installation, removal and production of the sealing elements are hereby made possible with higher precision at reasonable production costs.

The invention achieves this object with a rotary lobe pump of the aforementioned kind, wherein the rotary lobe pump has an apparatus for sealing the pump chamber in accordance with the preferred embodiments described above.

The pump chamber is sealed vis-a-vis the fluid-free region by the apparatus. The rotary lobe pump is preferably further developed in that the labyrinth gap extends from the front side of the rotary piston in the region of the base circle diameter of the rotary piston out to a shaft seal in the region of the shaft diameter.

According to another preferred embodiment of the rotary lobe pump, the shaft seal is formed as a cartridge seal.

In regard to further advantages of the rotary lobe pump according to the invention, reference is made to the above statements regarding the sealing apparatus.

BRIEF DESCRIPTION OF THE DRAWINGS

The invention is described in greater detail below on the basis of preferred embodiments and with reference to the attached drawings. The figures show the following.

DETAILED DESCRIPTION

Figure 1:
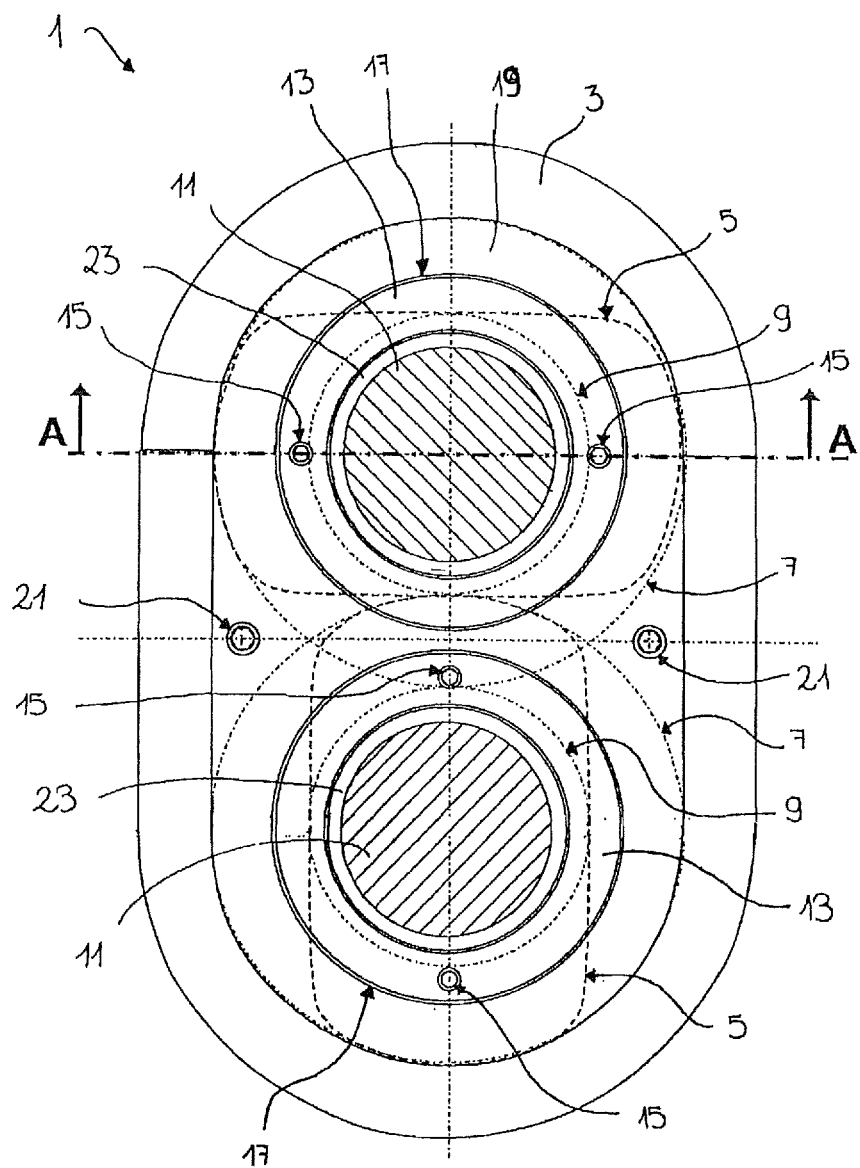
FIG. 1 a schematic side view through a rotary lobe pump according to the present invention.

FIG. 1 first shows the basic structure of a rotary lobe pump. A rotary lobe pump 1 having a housing 3 is shown. A pump chamber is provided within the housing 3, within which pump chamber two interlocking rotary pistons 5 are disposed. In each case, a rotary piston 5 has a base circle diameter 9 and a crown circle diameter 7. A section on the crown circle of one of the rotary pistons 5 revolves on a respective section of the base circle of the other rotary piston 5 in a manner that is generally known. In so doing, the rotary pistons 5 each form a cavity between a wall of the pump chamber and the rotary piston 5, within which the fluid is conveyed. The rotary pistons 5 are each housed on a shaft 11. A plurality of sealing elements is provided on a front side of each of the rotary pistons 5. According to FIG. 1, each of these are a first sealing element 13, which is formed as a co-rotating protective plate ring and can be fastened to each rotary piston 5 by means of a force-locking fastener, in the present example, clamping bolts 15. The first sealing element 13 is housed in a respective recess 17. The recess 17 is provided in a second sealing element 19. In the embodiment according to FIG. 1, two recesses 17 are provided in a single second sealing element 19 to house a first sealing element 13 for the respective rotary piston 5. Alternatively, two separate second sealing elements 19 may be provided in the housing 3 of the rotary lobe pump 1. The assembly of only a second sealing element 19, which at the same time houses both first sealing elements 13, has proven to be advantageous. In this exemplary embodiment, the second sealing element 19 is formed as an outer protective plate and can be connected by means of a force-locking fastener 21, in the present example likewise connecting bolts, to the housing 3 in a reversibly detachable manner.

In addition, a third sealing element 23 can be disposed on each shaft 11. According to the present exemplary embodiment, the third sealing element 23 is formed as a spacer ring.

Figure 2:
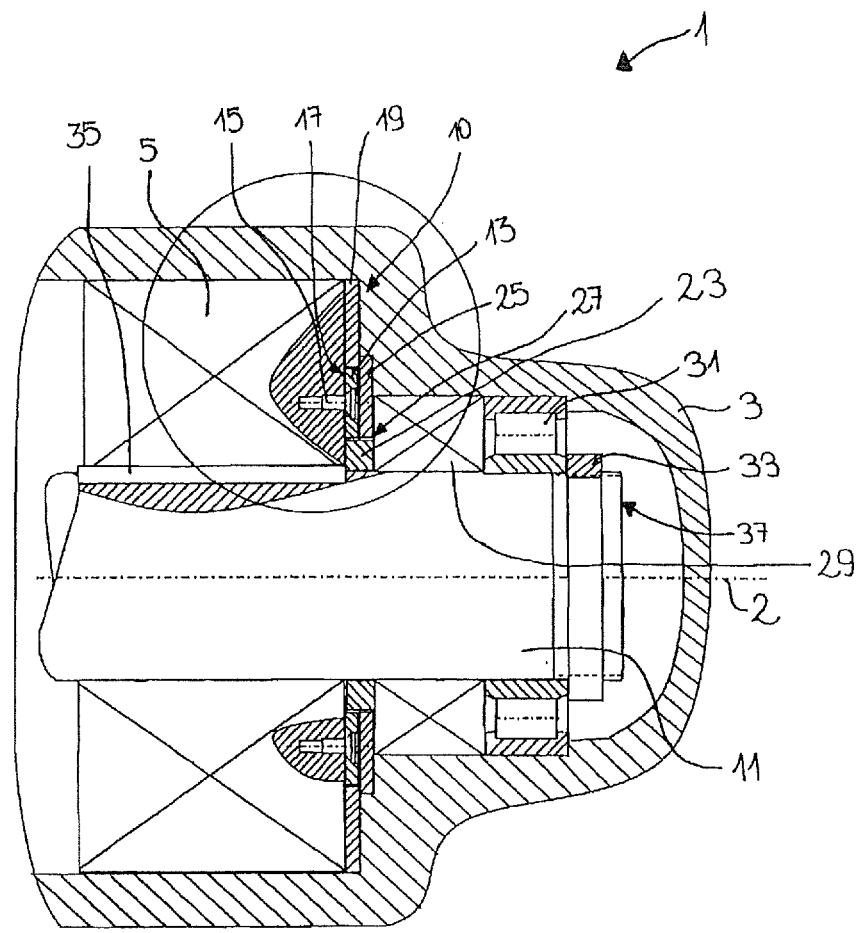
FIG. 2 a first cross-sectional view of the rotary lobe pump from FIG. 1 along the line A-A.

FIG. 2 shows a cross-sectional view along the line A-A in FIG. 1. The rotary lobe pump 1 shown in FIGS. 1 and 2 has an apparatus 10 according to the invention for the sealing of the pump chamber of the rotary lobe pump 1 against the leakage of fluid from the pump chamber. Within the housing 3, the first sealing element 13 is fastened to a front side of the rotary piston 5 by means of the fasteners 15 on the rotary piston 5. The first sealing element 13 according to FIGS. 1 and 2 is formed as an annular disk, the thickness of which in an axial direction is to be understood in relation to the axis of rotation 2 of the shaft and as essentially equal to the thickness of the second sealing element 19. The second sealing element 19 is connected to the housing 3 in a stationary manner. The recess 17, within which the first sealing element 13 is housed, has a diameter, which is slightly larger than the outer diameter of the first sealing element 13, so that a gap or annular gap is formed, which extends axially in the present exemplary embodiment between the first sealing element 13 and the second sealing element 19 in in an assembled arrangement.

In addition to the first sealing element 13 and the second sealing element 19 as well as the third sealing element 23, a fourth sealing element 25 is provided. The fourth sealing element 25 is formed as an inner protective plate and is connected to the housing 3 and the second sealing element 19 in a stationary manner. In alternative embodiments, the fourth sealing element is either formed as a body having two recesses 27 analogous to the second sealing element 19, or as a rotationally symmetrical body, for example in the form of an annular disk having only recess 27 in each case. The recess 27 is adapted to house the third sealing element 23. The diameter of the recess 27 is slightly larger than the outer diameter of the third sealing element 23, so that in an assembled arrangement, an annular gap extending in an axial direction extends between the fourth sealing element 25 and the third sealing element 23.

The fourth sealing element 25 has an outer diameter, which exceeds the diameter of the recess 17 of the second sealing element 19 in the embodiment shown, so that the fourth sealing element 25 and the second sealing element are disposed so that they overlap and are fastened to the housing 3. This makes it possible to adjust a distance between the first sealing element 13 and the fourth sealing element 25 in an axial direction. The result of this distance is a circumferential gap extending in a radial direction, which merges radially outward into the axial gap between the first sealing element 13 and the second sealing element 19, and which merges radially inward into the axial gap between the fourth sealing element 25 and the third sealing element 23. In regard to the profile of the gap, reference is made to the Figures below.

The third sealing element 23 is supported against a shaft seal 29, which is disposed between the housing 3 and the shaft 11. Furthermore, a bearing 31 is provided on the shaft 11, which is either introduced directly in the housing 3 by the outer ring thereof, or alternatively by means of a cup mount (not shown). According to FIG. 2, the bearing 31, the shaft seal 29, and the third sealing element 23 are secured by means of a shaft nut 33 due to the position of a fitting key 35. Alternatively, it is possible to secure these relative to a shaft shoulder or the like. The shaft nut 33 is disposed on a shaft end 37 of the shaft 11.

Figure 3:
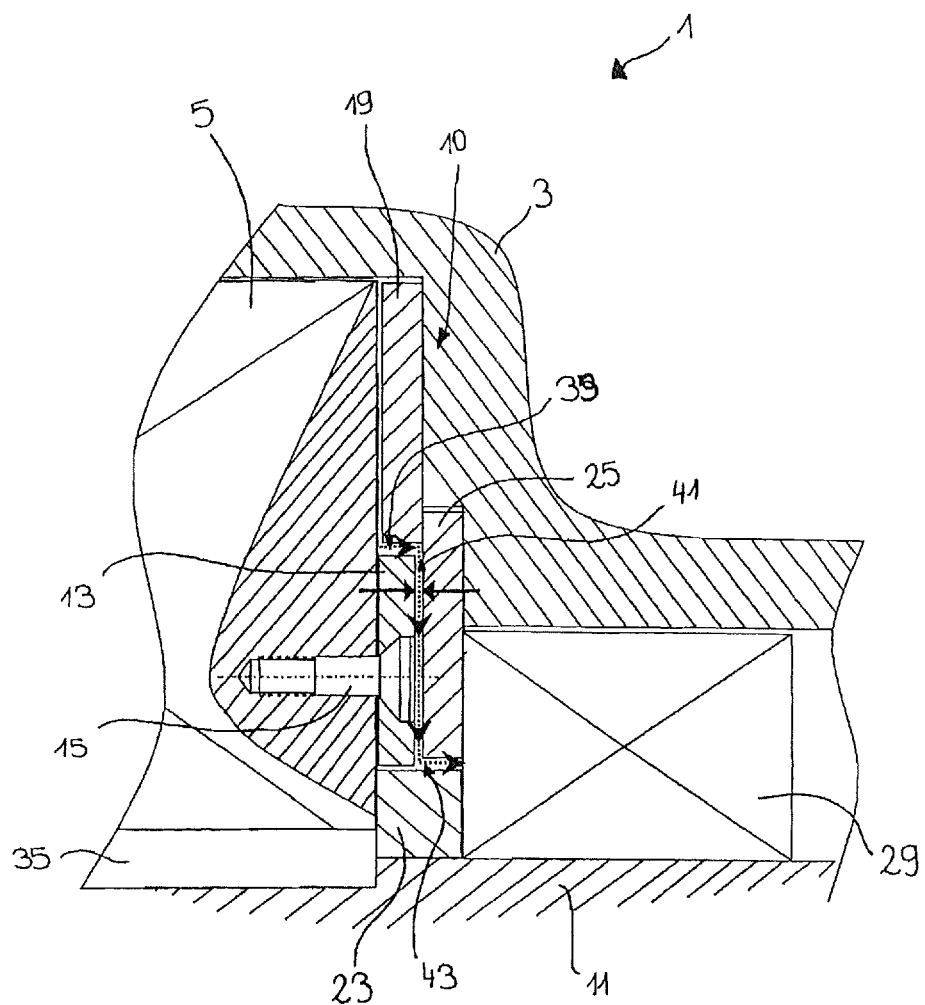
FIG. 3 an enlarged detail of the illustration in FIG. 2.

FIG. 3 shows an enlarged view of the profile of the labyrinth gap according to the invention. Different sections of the labyrinth gap extend between the first sealing element 13 and the second sealing element 19, between the first sealing element 13 and the third sealing element 23, and between the first sealing element 13 and the fourth sealing element 25. A first gap section 39 is formed between the first sealing element 13 and the second sealing element 19. This gap section 39, which essentially takes an axial course, merges into an essentially radial gap section 41 between the first sealing element and the fourth sealing element 25. The seal land from the entrance into the gap section 41 to the exit from the gap section 41 in a radial direction is larger than the seal land through which the fluid must pass when passing through the axial gap section 39 and a gap section 43 in an axial direction between third sealing element 23 and the fourth sealing element 41. The profile of the radial gap section 43 begins radially outward in the region of the base circle diameter relative to the shaft 11, especially preferably radially outward therefrom, and ends in a radial direction closer in the direction of the shaft 11 on the side of the shaft seal 19.

Figure 4:
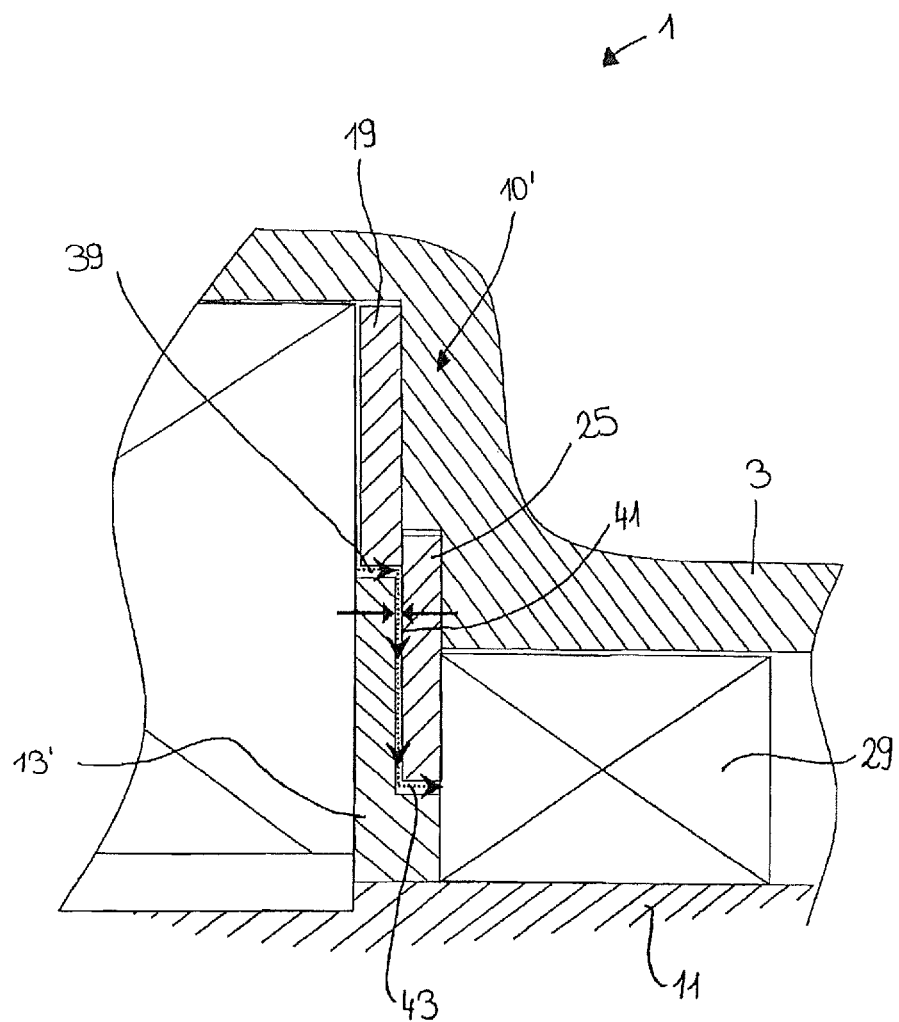
FIG. 4 a detailed view of the apparatus according to the invention according to a second preferred embodiment.

FIG. 4 shows an alternative embodiment of the apparatus 10 according to the invention in FIGS. 1 to 3 in an assembly with a rotary lobe pump 1 according to the invention. The apparatus $10^I$ shown in FIG. 4 has a second sealing element 19 and a fourth sealing element 25 along the lines of the embodiment in FIGS. 1 to 3. In contrast to the embodiment according to FIGS. 1 to 3, the first sealing element and the third sealing element are designed as a single first sealing element $13^I$. A projection is formed radially inward, relative to the shaft 11, in the direction of the shaft seal 29 on the side of the first sealing element $13^I$ adjacent to the labyrinth gap. Consequently, both the radial gap section 41 and the inner axial gap section 43 are formed between the first sealing element $13^I$ and the fourth sealing element 25. Strictly speaking, the fourth sealing element 25 according to this exemplary embodiment could be designated as the third sealing element, because the apparatus $10^{II}$ only has three sealing elements. For reasons of clarity, however, this designation is retained.

Figure 5:
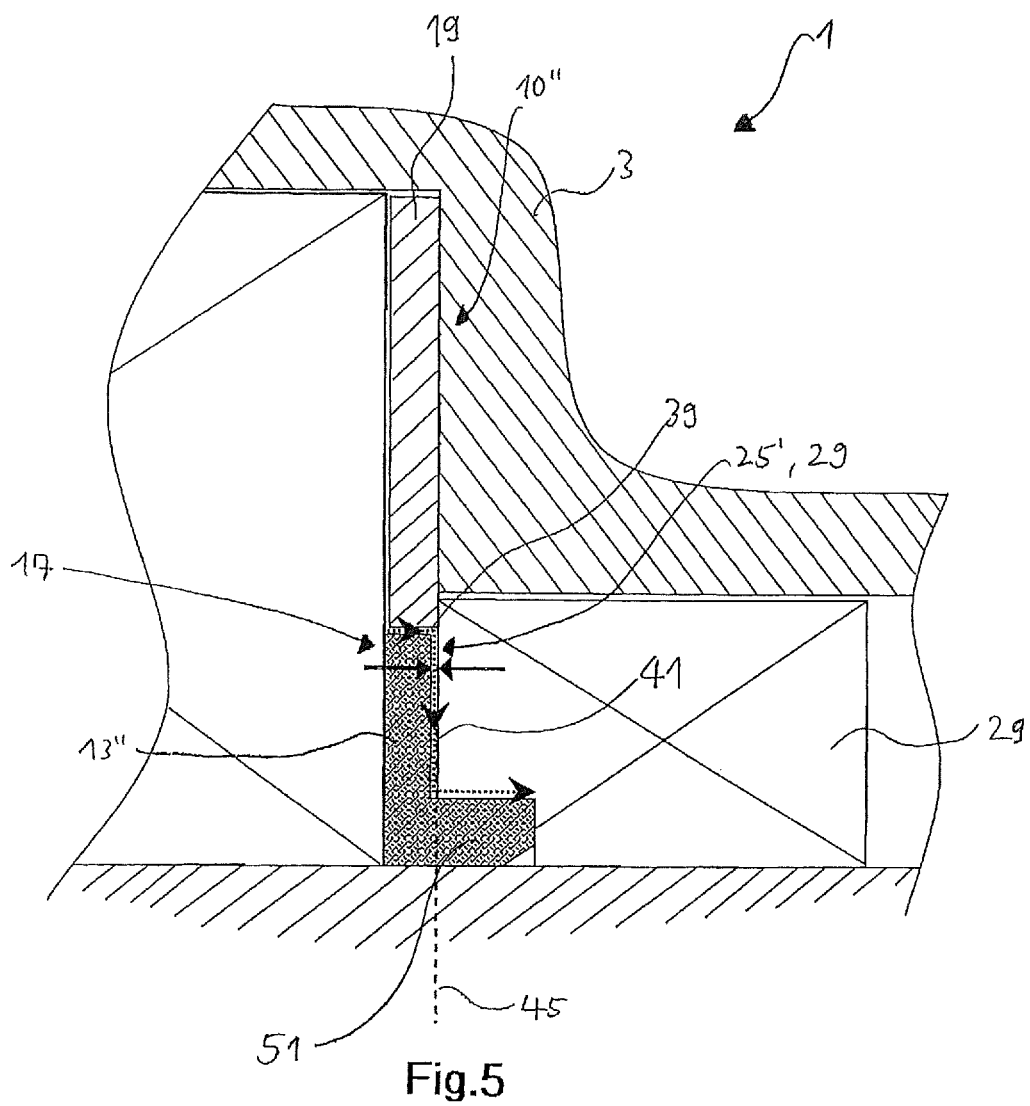
FIG. 5 a detailed view of the apparatus according to the invention according to a third preferred embodiment.

FIG. 5 shows a third embodiment of the apparatus $10^{II}$ according to the invention, installed in a housing 3 of the rotary lobe pump 1 according to the invention. Like the embodiments in the preceding Figures, the apparatus $10^{II}$ has a second sealing element 19. A first sealing element $13^{II}$ is housed within the recess 17 of the second sealing element 19, thereby forming a gap section 39 of the labyrinth gap extending essentially axially between the second sealing element 19 and the first sealing element $13^{II}$. The gap section 41 of the labyrinth gap extending essentially radially is formed between the first sealing element $13^{II}$ and the wall 45 of the shaft seal 29. The shaft seal 29 is thus optionally formed as a "fourth" sealing element $25^I$.

According to this exemplary embodiment, the first sealing element $13^{II}$ is formed having a projection 51, which extends into the inside of the shaft seal 29. The first sealing element 13$^{II}$ is preferably formed as an integral element of a cartridge seal or the like. According to this embodiment, the first sealing element 13$^{II}$ is partially integrated in the shaft seal 29 and, together with the shaft seal 29, is optionally exchangeable. In analogous terms, the shaft seal 29 is optionally integrated into the apparatus 10$^{II}$. In this way, the apparatus 10$^{II}$ can be retrofitted in rotary lobe pumps 1 of all design sizes by exchanging the shaft seals previously installed therein and replacing these with the shown solution according to FIG. 5. The seal land, which the labyrinth gap forms according to this embodiment, consists of an axial section, the gap section 39, and a radial section, the gap section 41.

The invention claimed is:

1. An apparatus for sealing a pump chamber of a rotary lobe pump vis-a-vis a fluid-free region of a shaft duct of the rotary lobe pump, comprising:
    first and second sealing elements, configured to be disposed adjacent to a front side of a rotary piston defining a base circle and disposed on a shaft in the pump chamber of the rotary lobe pump in such a way that a labyrinth gap extends between the first and second sealing elements, said labyrinth gap being arranged in a radial direction relative to the shaft and in an axial direction in order to extend a seal land,
    wherein the seal land is larger in a radial direction relative to the shaft than in an axial direction relative to the shaft, and
    wherein the first sealing element is formed as an annular disk and has an outer diameter which extends beyond the base circle of the rotary piston.

2. The apparatus according to claim 1,
wherein the labyrinth gap has one or more gap sections that extend axially relative to the shaft, and one or more gap sections that extend radially relative to the shaft.

3. The apparatus according to claim 1,
wherein the first sealing element is configured to be fastened to the front side of the rotary piston by means of a form-locking or force-locking fastener and the second sealing element is configured to be fastened to the housing of the rotary lobe pump by means of a form-locking or force-locking fastener.

4. The apparatus according to claim 1,
wherein the first sealing element has a projection disposed against a shaft seal as a support.

5. The apparatus according to claim 1,
comprising a third sealing element, which is formed as a spacer ring and which is disposed against a shaft seal as a support.

6. The apparatus according to claim 1,
wherein the second sealing element is formed as an outer protective plate and is configured to be fastened to a wall of the pump chamber of the rotary lobe pump.

7. The apparatus according to claim 6,
wherein the second sealing element has a recess, the contour of which corresponds to the first sealing element in such a way that the first sealing element is configured to be partially or fully disposed within the recess.

8. An apparatus for sealing a pump chamber of a rotary lobe pump vis-a-vis a fluid-free region of a shaft duct of the rotary lobe pump, comprising:
    first and second sealing elements, configured to be disposed adjacent to a front side of a rotary piston disposed on a shaft in the pump chamber of the rotary lobe pump in such a way that a labyrinth gap extends between the first and second sealing elements, said labyrinth gap being arranged in a radial direction relative to the shaft and in an axial direction in order to extend a seal land,
    wherein the seal land is larger in a radial direction relative to the shaft than in an axial direction relative to the shaft,
    a third sealing element, and
    a fourth sealing element, which is formed as an inner protective plate and is configured to be fastened to a wall of the pump chamber of the rotary lobe pump adjacent to the first sealing element in such a way that a radial gap section extends between the first sealing element and the fourth sealing element.

9. The apparatus according to claim 8,
wherein the second sealing element has a recess and the fourth sealing element has an outer diameter, which is larger than an outer diameter of the recess of the second sealing element, and is configured to be positioned overlapping the second sealing element with respect to the recess.

10. The apparatus according to claim 8,
wherein at least one of the first sealing element, the second sealing element, the third sealing element, or the fourth sealing element is formed rotationally symmetrical and is configured to be coaxially disposed with respect to the shaft.

11. The rotary lobe pump according to claim 10,
wherein the labyrinth gap extends from the front side of the rotary piston in a region of the base circle diameter of the rotary piston outward to a shaft seal in a region of the shaft diameter.

12. A rotary lobe pump for conveying liquids containing solids, comprising:
    a housing with a pump chamber and at least one pair of interlocking rotary pistons disposed inside the pump chamber, which are each mounted on a shaft, wherein the shaft (a) extends out of the pump chamber into a fluid-free region of the rotary lobe pump and (b) has a seal,
    wherein the rotary lobe pump has an apparatus for sealing the pump chamber comprising:
    first and second sealing elements configured to be disposed adjacent to a front side of a rotary piston disposed on a shaft in the pump chamber of the rotary lobe pump in such a way that a labyrinth gap extends between the first and second sealing elements, said labyrinth gap being arranged in a radial direction relative to the shaft and in an axial direction in order to extend a seal land, wherein the seal land is larger in a radial direction relative to the shaft than in an axial direction relative to the shaft; and
    wherein the seal of the shaft is formed as a cartridge seal.

* * * * *

UNITED STATES PATENT AND TRADEMARK OFFICE
CERTIFICATE OF CORRECTION

PATENT NO. : 9,212,659 B2
APPLICATION NO. : 14/117039
DATED : December 15, 2015
INVENTOR(S) : Paul Krampe et al.

It is certified that error appears in the above-identified patent and that said Letters Patent is hereby corrected as shown below:

ON THE TITLE PAGE:

In the Foreign Application Priority Data section, Item (30), the priority application number is incorrect. Please change "20 2011 100 622 U" to --20 2011 100 622.4 U--.

Signed and Sealed this
Twenty-second Day of March, 2016

Michelle K. Lee
*Director of the United States Patent and Trademark Office*